United States Patent [19]

Surka et al.

[11] Patent Number: 5,317,388
[45] Date of Patent: May 31, 1994

[54] METHOD AND APPARATUS FOR DETERMINING THE DISPLACEMENT OF A RECTANGULAR OBJECT WITH RESPECT TO A REFERENCE POSITION

[75] Inventors: Stefan Surka, Sandy Hook; Joe Zheng, Brookfield; Laura Kelmar, Danbury, all of Conn.

[73] Assignee: United Parcel Service of America, Inc., Atlanta, Ga.

[21] Appl. No.: 905,563

[22] Filed: Jun. 29, 1992

[51] Int. Cl.⁵ .............................................. G01B 11/00
[52] U.S. Cl. ................................... 356/373; 356/375; 901/47
[58] Field of Search ................... 356/373, 375, 394; 901/47; 358/107; 250/561

[56] References Cited

U.S. PATENT DOCUMENTS

| | | | |
|---|---|---|---|
| 3,661,465 | 5/1972 | Groh | 356/172 |
| 4,105,925 | 8/1978 | Rossol et al. | 356/375 |
| 4,136,957 | 1/1979 | Uno et al. | 356/394 |
| 4,575,304 | 3/1986 | Nakagawa et al. | 901/47 |
| 4,612,666 | 9/1986 | King | 382/32 |
| 4,873,651 | 10/1989 | Raviv | 364/513 |
| 5,198,876 | 3/1993 | Anezaki et al. | 901/47 |

FOREIGN PATENT DOCUMENTS

| | | | |
|---|---|---|---|
| 65203 | 4/1984 | Japan | 356/375 |
| 17735 | 1/1988 | Japan | 901/47 |
| 257206 | 10/1989 | Japan | 356/375 |

Primary Examiner—F. L. Evans
Attorney, Agent, or Firm—James A. Drobile; William H. Murray; Robert E. Rosenthal

[57] ABSTRACT

A method for determining the displacement in six degrees of freedom of a rectangular planar surface with respect to a reference position includes providing a reference image having projections of a defined lighting pattern having at least six points on a reference rectangular planar surface in the reference position, the six points including first, second and third points on the reference surface, fourth and fifth points at the intersections of a first edge of the reference surface and, respectively, first and second parallel lines in the plane of the reference surface and perpendicular to the first edge, and a sixth point at the intersection of a second edge of the reference surface and a third line in the plane of the reference surface and perpendicular to the second edge, the first edge being perpendicular to the second edge, and the first and second points being in known relationship with the first, second and third lines. The method further includes the step of obtaining a real image including the projection of the lighting pattern on the surface, and determining the displacement of the surface with respect to the reference position from the positions of the six points in the reference image and the real image.

24 Claims, 6 Drawing Sheets

METHOD AND APPARATUS FOR DETERMINING THE DISPLACEMENT OF A RECTANGULAR OBJECT WITH RESPECT TO A REFERENCE POSITION

BACKGROUND OF THE INVENTION

This invention relates to machine vision systems, and in particular to machine vision systems having application in the handling of packages.

In the shipment of parcels and packages, large truck trailers and the like must be loaded at a hub or sorting facility with a large number of packages. Conventionally, the majority of packages are parallelepipeds. Thus, such packages can conveniently be stacked in loading trailers. Such loading of trailers is conventionally accomplished manually. However, manual loading suffers from the disadvantages that the packages are frequently manually stacked in an unstable manner which may result in package shifting in transit and resulting damage. In addition, when packages are manually stacked, the space utilization within the trailer is ordinarily inefficient.

It has thus been proposed that an automated system be developed for stacking of packages within a trailer. Such an automated system would desirably include an apparatus to measure the weight and size of each package and, through appropriate algorithmic techniques, select a location on a stack for placement of each package with a high degree of stability and efficient utilization of space. Upon determination of a location, a robotic arm and gripper or hand, provided in the automated system, would place the package in the selected location.

A feedback system is required to determine whether each package, once placed by the gripper is in fact in the selected location. Such feedback information is required to avoid package collision in subsequent stacking. Machine vision systems might provide such a feedback system. However, any feedback system must determine in real time whether each package is placed properly. Thus, calculations of whether the package is properly placed must take place within the cycle time of package placement. This cycle time is desirably short, in order to provide a high throughput of packages. For example, a desirable system might have a cycle time of two seconds.

The complete determination of the position of an object on a stack, and, more specifically, the determination of the displacement of an object from a desired position, requires obtaining six offsets with respect to the desired position. These offsets include, in a three-axis coordinate system, three translation offsets due to the translation of the package along each axis, and three rotational offsets due to the rotations of the package about the three axes. Existing machine vision systems designed for inspection and sensing over the conveyor belt lack the capability of measuring six offsets from a single image. Systems, such as stereo sensing systems, have been provided which are capable of analyzing images made from different locations, but such systems require processing a large quantity of data. Processing a large quantity of data is either difficult or impossible to achieve in real time or, if possible, requires substantial expense in computational hardware.

In addition, existing machine vision systems are subject to difficulties in interpreting data as a result of uneven or unpredictable ambient lighting.

It is thus an object of the invention to provide a method and apparatus for determining the location and orientation of a rectangular object with respect to a reference location and orientation in a short period of time.

It is a further object of this invention to provide a method and apparatus for determining the location of a rectangular object with respect to a reference position that includes effective illumination of the object so that data is independent of ambient lighting conditions.

Additional objects and advantages of the present invention will become evident from the detailed description of a preferred embodiment which follows.

SUMMARY OF THE INVENTION

A method for determining the displacement in six degrees of freedom of a rectangular planar surface with respect to a reference position includes the steps of obtaining a reference image having a projection of a defined lighting pattern comprising at least six points on a reference surface in the reference position, the six points including first, second and third points on the reference surface, fourth and fifth points at the intersections of a first edge of the reference surface and, respectively, first and second parallel lines in the plane of the reference surface and perpendicular to the first edge, and a sixth point at the intersection of a second edge of the reference surface and a third line in the plane of the reference surface and perpendicular to the second edge, the first edge being perpendicular to the second edge, the first and second points being in known relationship with the first, second and third lines; obtaining a real image including the projections of the same lighting pattern on the surface, and determining the displacement of the surface with respect to the reference position from the positions of the six points in the reference image and the real image.

An apparatus for determining the displacement in six degrees of freedom of a rectangular planar surface with respect to a reference position includes an apparatus for obtaining a reference image comprising a projection of a defined lighting pattern including at least six points on a reference rectangular planar surface in the reference position, the six points comprising first, second and third points on the reference surface, fourth and fifth points at the intersection of a first edge of the reference surface and, respectively, first and second parallel lines in the plane of the reference surface and perpendicular to the first edge, and a sixth point at the intersection of a second edge of the reference surface and a third line in the plane of the reference surface and perpendicular to the second edge, the first edge being perpendicular to the second edge, and the first and second points being in known positional relationship with the first, second and third lines; apparatus for obtaining a real image including the projection of the lighting pattern on the surface; and an apparatus for determining the displacement of the surface with respect to the reference position from the positions of the six points in the reference image and the real image.

In a system for automated placement of rectangular objects in a stack, including a camera for acquiring an image of the placed object for verification of placement accuracy, an improvement includes means, including a strobe light, for illuminating at least a portion of the object substantially instantaneously at a strobe light intensity substantially greater than the intensity of ambient illumination.

In a method for automated placement of rectangular objects in a stack, including the steps of acquiring, by use of a camera, an image of the placed object for verification of placement accuracy, an improvement includes the step of illuminating, by use of a strobe light, at least a portion of the object substantially instantaneously at a strobe light intensity substantially greater than the intensity of ambient illumination.

DETAILED DESCRIPTION OF A PREFERRED EMBODIMENT

Figure 1:
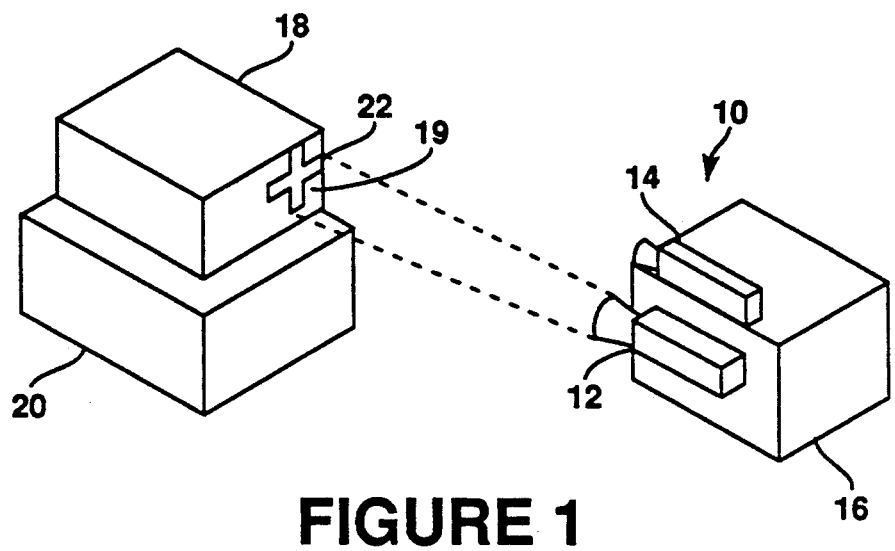
FIG. 1 is a partially schematic perspective view of an apparatus according to the invention.

Referring now to FIG. 1, there is depicted in a partially-schematic perspective view, an apparatus 10 according to the invention in operation. Apparatus 10 includes a camera 14 and a strobe light apparatus 12, both of which are mounted on the housing 16 of a robotic gripper.

There is disposed opposite system 10, first package 20 and second package 18 disposed on top of first package 20. These two packages, represented schematically, are examples of packages that would be placed in a stack. For example, the packages could be placed in a stack in a trailer or other vehicle interior. Second package 18 has just been placed in the stack by a robotic system which includes gripper housing 16. Both packages 18 and 20 are rectangular parallelepipeds. As will be made evident later on in this detailed description, the invention is generally intended for use with objects, such as packages or parts, that are rectangular parallelepipeds.

Strobe light 12 is projecting pattern 22 on a surface 19 of package 18. Pattern 22 is generally cross-shaped, having two perpendicular intersecting bars of defined thickness. Surface 19 of package 18 is substantially planar and rectangular. Pattern 22 is projected near a corner of surface 19. As a result, each of the bars of pattern 22 intersect edges of package 18. As will be explained in the detailed description below, it is an important feature of the invention that pattern 22 be projected sufficiently close to a corner of a substantially rectangular package face that pattern 22 extends to two edges of the package.

It will be noted that strobe light 12 is displaced from a lens of camera 14 in two axes of a coordinate system in which the bars of pattern 22 are parallel to the axes. As will become evident below in this detailed description, this relative positioning of the camera 14 and strobe light 12 is highly advantageous in the method and apparatus of the invention.

Camera 14 is preferably a conventional charge-coupled device (CCD) imager. Strobe light 12 provides pattern 22 at a predefined strobe light intensity. The strobe light intensity must be sufficiently greater than the intensity of ambient lighting that pattern 22 may readily be distinguished from surfaces illuminated only by ambient lighting. Strobe light 12 preferably has an intensity of at least 2000 candles per square foot, and preferably 4000 candles per square foot.

Figure 2:
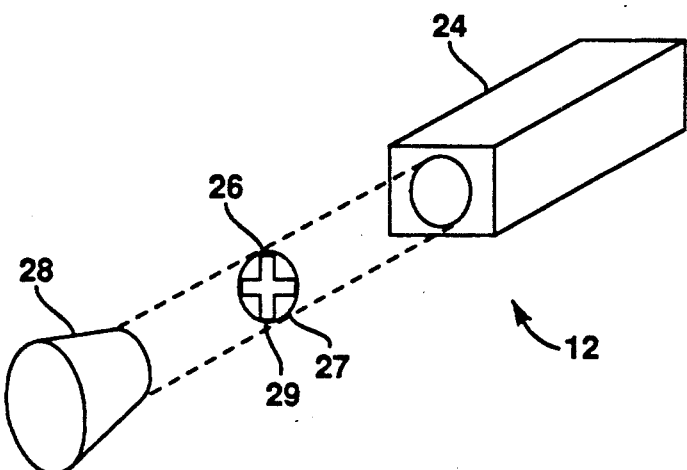
FIG. 2 is a partially schematic detailed view of a projection apparatus according to the invention.

Referring now to FIG. 2, there is shown an exploded, schematic, perspective view of strobe light apparatus 12 according to the invention. Strobe light apparatus 12 comprises a housing 24, which includes a flash bulb, reflectors and other conventional equipment (not shown). A conventional hood 28 is provided disposed on the forward face of housing 24. An appropriate lens (not shown) is provided in hood 28. Substantially at the forward face of housing 24 there is disposed a filter 26 which has an optically opaque section 27 and an optically transparent section 29. Optically transparent section 29 is provided in the shape of pattern 22. Thus, there is provided a simple apparatus for projecting strobe light 22 on forward surface 19 of box 18.

Figure 3:
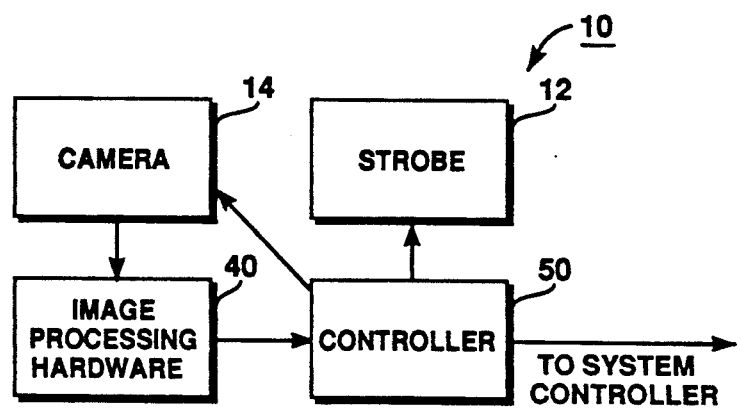
FIG. 3 is a block diagram of the components of an apparatus according to the invention.

Referring now to FIG. 3, there is depicted a block diagram of an apparatus 10 according to the invention. The apparatus 10 comprises a strobe 12 and camera 14, as illustrated in FIG. 1. In addition, the apparatus comprises image processing hardware 40 and a controller 50. Controller 50 is connected to strobe 12 by appropriate data lines so that controller 50 may provide a signal at a selected time for strobe 12 to be activated. Controller 50 is also connected to camera 14 by appropriate data lines so that controller 50 may provide a signal to camera 14 to obtain an image of the light projected by strobe 12. Camera 14 has an output which is coupled by appropriate data lines to an input of image processing hardware 40. This permits image data obtained by camera 14 to be transmitted to image processing hardware 40 for appropriate processing, as explained in detail below. Image processing hardware 40 has an output coupled through appropriate data lines to an input of controller 50. Thus, package displacement information calculated by image processing hardware 40, from the image data provided by camera 14, is provided to controller 50. Controller 50 is linked by appropriate data lines to a system controller (not shown) for an entire robotic package-handling system, which includes a robotic arm, a robotic wrist, and a robotic gripper. Appropriate software modules included in a software system used by a system controller are desirably provided to signal the proper time for controller 50 to provide signals to strobe 12 and camera 14, and to receive package displacement information from controller 50.

Figure 4:
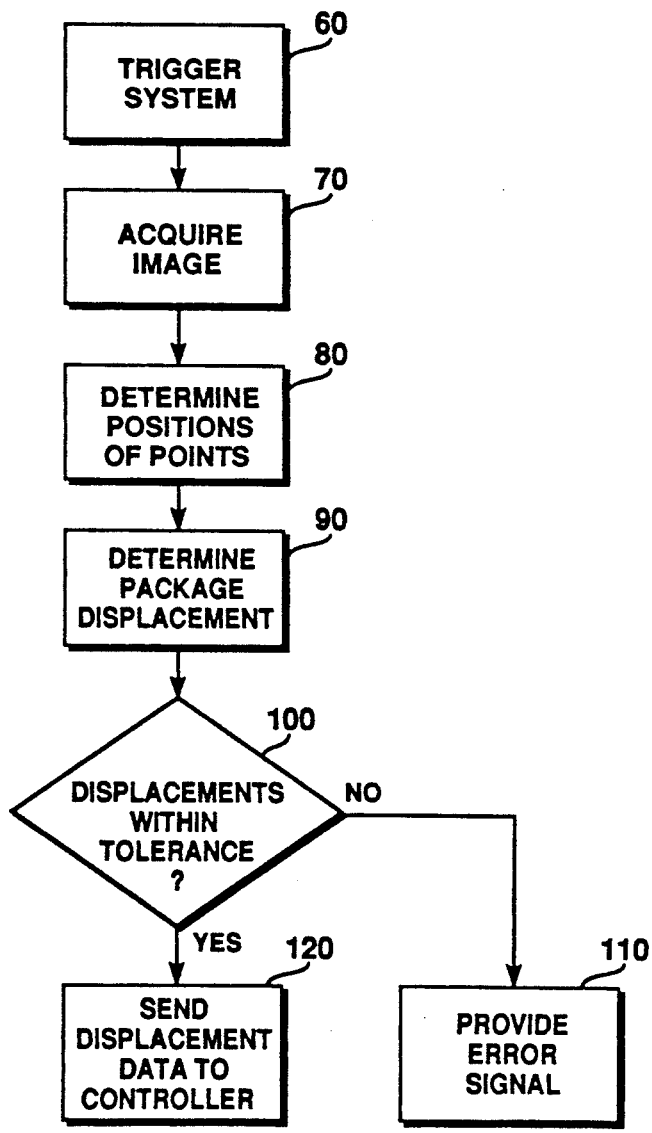
FIG. 4 is a flow chart of the operation of an apparatus according to the invention.

Referring now to FIG. 4, there is depicted a flow chart showing the overall process flow in a method and system according to the invention. The first step is the triggering or activation of the system according to the invention which indicated by box 60, labeled TRIG- GER SYSTEM. The system according to the invention is triggered or activated when an appropriate signal is received by controller 50 from a robotic system controller. The system is triggered after placement of a package by the robotic gripper, and withdrawal, by appropriate motion of the robotic arm, of the gripper housing, on which camera 14 and strobe 12 are disposed, a selected distance away from the surface of the package. The selected distance from the package surface should be sufficient that, if the package is placed in an unstable position, and then falls, the package will not collide with the stationary gripper. Once the robotic arm stops, a selected short period of time is provided to assure that the gripper is substantially stationary. The system is then activated, probably, as noted above, by a signal provided to controller 50.

The next step is that of acquiring the image, as shown by box 70, labeled ACQUIRE IMAGE. In the step of acquiring the image, the strobe 12 is activated to project pattern 22 of FIG. 1 on the surface of a package, near a corner thereof, and the camera 14 is simultaneously activated to receive an image of the projected pattern. The image data is received as a set of gray level values, and are transmitted to image processing hardware 40 for appropriate processing.

The following steps are carried out by image processing hardware 40.

The first step is the processing of the acquired image to determine the projections in the image of selected points of pattern 22, as indicated by box 80, labeled DETERMINE POSITIONS OF POINTS. The selected points and the method by which the projections thereof are obtained are explained in more detail below.

The next step is a computational step by which, from the determined projections of the selected points, the displacements in six degrees of freedom, that is, translational displacements in three axes and rotational displacements about three axes, are determined. This step is indicated by box 90, labeled DETERMINE PACKAGE DISPLACEMENT. The detailed calculations of the step are explained below in more detail with reference to FIG. 5. The result of this step is package offset data indicating the degree of translational displacement in each of three axes, and the amount of rotational displacement of the package about each of those three axes.

The next step, indicated by box 100, labeled DISPLACEMENTS WITHIN TOLERANCE?, is determining whether the determined displacements are within preselected tolerances. The purpose of this step is to determine whether there has been such a substantial displacement of the package that investigation and intervention by a human operator is required. The displacements, which have been calculated in pixels, must be converted to a real system in order to determine whether the displacements are within tolerance. A predetermined ratio of pixels per unit distance may be provided, based on the ratio at the reference image. For example, an excessive displacement may mean that a package has fallen from the stack, or has been substantially jarred and rotated by the gripper. A translational error along any axis of, for example, two inches, may be set as a tolerance limit. If the tolerance limit is exceeded, the next step is for image processing hardware 40 to provide an error signal to controller 50, as indicated by box 110, labeled PROVIDE ERROR SIGNAL. Controller 50 may then cause, for example, an error signal to be provided to the operator, by an audible or visible signal, if suitable hardware is provided. The error signal need not be provided directly to the human operator by the apparatus according to the invention. Controller 50 may provide an error signal to the robotic system controller, which, by suitable software, may then cause a user interface, such as a monitor, to provide a signal to a human operator.

If the package displacement or offset data is determined in this step to be within tolerances, then the apparatus of the invention provides offset data to the robotic system controller, as indicated by box 120, which is labeled SEND DISPLACEMENT DATA TO CONTROLLER. This is then the final step in the processing of an image according to the invention. The offset data may then be used by the system controller. Typically, the system controller will include stacking model software, to select a desired position for placement of the next package on a stack. The inputs for such software include the positions and orientations of packages in the stack, and the dimensions and weight of a next package to be placed in the stack. The offset data will be used by the system controller to correct the information stored in its stacking model regarding the position and orientation of the last-placed package in the stack. The offset data is thus used in such a stacking model for determining the placement of succeeding packages. Thus, enhanced accuracy of placement will be obtained and collisions between packages being placed by the robot gripper and those already in the stack will be avoided.

Figure 9A:
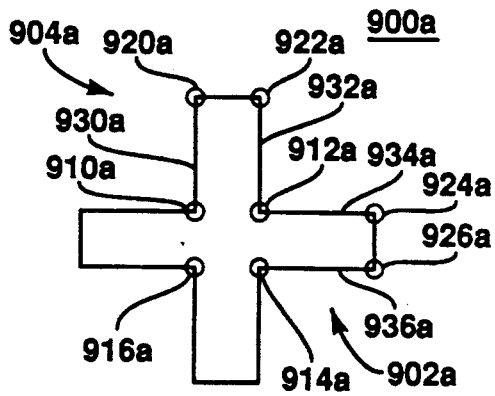
FIGS. 9A–9E show examples of distortions of a projected lighting pattern in a method and apparatus according to the invention.

There will now be explained briefly the image processing steps according to a preferred embodiment of the invention. The purpose of the image processing steps is to determine the location, on an image that has been acquired, in the step indicated by box 70 of FIG. 4, by the camera, of the points of interest in a pattern 22 on package 18. The points of interest are selected so that determination of the selected points provides sufficient information to calculate the translational displacement of the package in three axes, and the rotational displacement of the package about those three axes. Of course, additional points may be obtained in order to provide redundancy for eliminating gross errors, as well as to provide some averaging of data. A desired minimum number of points would be three points on the surface on which the lighting pattern is projected, two points that are located at the intersection of a first package edge and respective parallel lighting pattern lines perpendicular to the first edge, and at least one point on a second edge, perpendicular to the first edge, which is located at the intersection of the second edge and a line generally perpendicular to that edge. It has been found desirable to locate a fourth point on the surface of the package, and a second point at the intersection of a line and the second edge of the package, for providing some redundancy which may be used to check the accuracy of the measurements. In a preferred embodiment, a structured lighting pattern such as a cross-shaped pattern comprising two bars of predetermined thickness, intersecting substantially at their centers, and disposed perpendicular to one another, is employed. Other structured lighting patterns, having similar points of interest, may also be employed in accordance with the invention. Referring to FIG. 9A, there is shown a pattern 900a, having bars 904a, 902a in a reference image, provided that the apparatus is mounted perpendicular to the reference plane. The reference image of FIG. 9A is an example where the apparatus is mounted perpendicular to the reference plane. The four points on the object surface, 910a, 912a, 914a, 916a, correspond to the internal corners of the cross. The two points, 924a, 926a, along the first edge of the box correspond to the points of intersection of the edges, 934a, 936a, of bar 902a of the cross with the first edge of the package. It will be understood that lines or edges 934a, 936a, are parallel to one another. The two points, 920a, 922a, along the second edge of the box correspond to the points of intersection of the edges, 930a, 932a, of bar 904a with the second edge of the package. It will be understood that lines or edges 930a, 932a, are parallel to one another.

The method of obtaining the eight points, from stored image data, may employ any one of numerous conventional defined image processing techniques, including point and line searching, known to those of ordinary skill in the art, for obtaining points from the image information provided by a camera. In a preferred embodiment, first, the portion of the entire camera image which includes the projected lighting pattern is identified.

Second, each point in the selected region of the image is assigned as either illuminated or non-illuminated. As is conventional, all points having a selected threshold gray level and above will be assigned as illuminated points, and all points below the selected threshold grey level will be deemed nonilluminated points. The threshold gray level is selected by first obtaining a histogram having on its horizontal axis all of the possible gray levels, and as its vertical axis the number of pixels corresponding to each gray level. The strobe intensity is selected so as to provide a distinct valley between portions of the image illuminated only by ambient light and those illuminated by the strobe. Thus, a threshold level may easily be chosen, with minimal inaccuracies in assigning image points to the illuminated or non-illuminated categories. Conventional software may be used to compute the histogram of the image and to select a threshold level, or a fixed threshold could also be preselected.

Third, the edges of the image of the pattern are determined using standard techniques. Fourth, the lines or edges acquired in the preceding step are analyzed to determine the intersections of those lines, which are the points of interest. This may be achieved using a standard technique, such as the Hough Transform.

The next portion of the method is directed to determining the displacements, based upon a comparison of the locations of the identified points with stored reference location information for those respective points. The determination of the displacements also includes other imaging geometry information, such as the distance between the camera lens and the CCD array, the displacement of the strobe light with respect to the camera lens, and the distance between the camera lens and the reference image. It is understood that the calculations required to determine the displacements do not require all eight points of interest. Rather, the six parameters comprising the offset information may be determined from six points. In the stored reference information, the points are located where they would be if the pattern had been projected on a box that was located in the ideal or reference position. The difference between the actual positions and the stored position determines the displacement.

Figure 6:
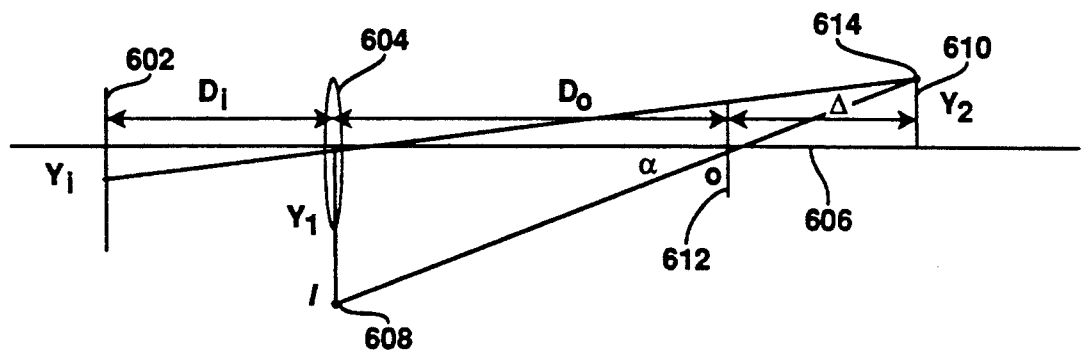
FIG. 6 is a schematic view of the imaging geometry in determining the location of a point on a surface of an object in a method according to the invention.

In order to explain the data processing steps in determining the offsets, it is necessary to explain the imaging geometry of the system. Referring now to FIG. 6, the imaging geometry of the system is schematically illustrated. An image plane 602, which is, in a preferred embodiment, a CCD array, and a camera lens 604, are shown. The optical axis of the system is identified by a horizontal line 606. In the plane of the lens 604, there is illustrated, displaced from the midpoint of the lens by a distance $Y_1$, a point light source 608, located at point 1. Point light source 608 corresponds to the position of strobe light 12. It is essential that the strobe be displaced from the optical axis of the camera in at least one, and preferably in two, axes. To the right side of FIG. 6, there is disposed a displaced package face 610. Intermediate displaced package face 610 and lens 604 there is disposed point o. Point o is the point on reference plane 612 where the light source projects through the optical axis. The distance between lens 604 and reference plane 612 is $D_o$. The distance between reference plane 612 and the displaced package face 610 is $\Delta$. The distance between lens 604 and image plane 602 is $D_i$. It will be appreciated that the projection of point o onto the displaced package face 610 is at point 614, located a distance $Y_2$ from optical axis 606. It can be understood from FIG. 6, that the value of the displacement $\Delta$ is given by the following equation:

$$\Delta = \frac{Y_i \times (D_0)^2}{(D_i \times Y_1) - (Y_i \times D_0)}$$

Figure 5:
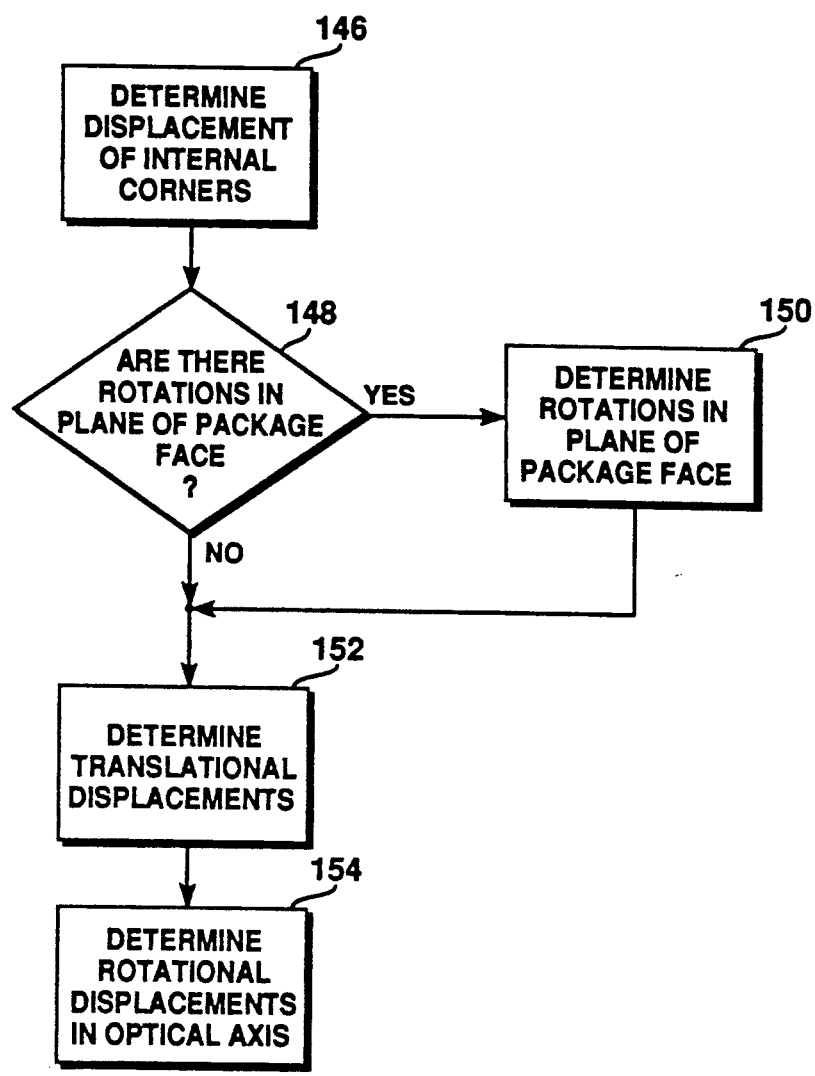
FIG. 5 is a flow chart of the displacement calculation steps in a method according to the invention.

A positive value of $\Delta$ indicates that package face 610 is to the left of point o in FIG. 6; a negative value of $\Delta$ indicates that package face 610 is to the right of point o in FIG. 6. It will also be understood that an analogous equation can be used to calculate the depth displacement based on displacements in the x-direction. Thus, it is desirable that the strobe light be displaced from the optical axis in both the x and y axes. In practice, both the x and y direction displacements can be calculated in real time and compared. If there are substantial differences, then it can be assumed that the offsets are outside the tolerances. An appropriate maximum difference between the x and y direction rotations can be selected. Thus, as indicated in FIG. 5, in box 146, labeled DETERMINE DISPLACEMENT OF INTERNAL CORNERS, the displacement along the optical axis of the camera of the plane of the actual package from the reference plane at each of the internal corners may be determined. Based on this information, the plane of the package face can be determined by conventional calculations.

Figure 9D:
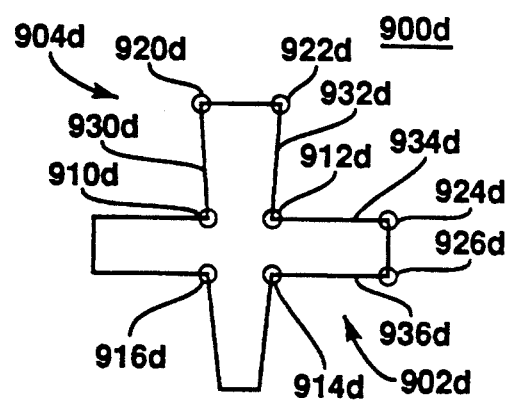

The absence or presence of rotations in the plane of the package face can be determined by a calculation of distances between selected pairs of image points and a comparison of such distances. To determine the presence or absence of a rotation, other than a rotation about the optical axis the distance between a first pair of points and a second pair of points, opposite from the first pair of points, are calculated and compared. Referring, for example, to FIG. 9D, an image 900d is shown which is an image of a lighting pattern projected on a surface that possesses a rotation about a horizontal axis. The distance between point 910d and point 912d is thus different from the distance between point 916d and point 914d. Similarly, FIG. 9E illustrates image 900e of a lighting pattern projected on a surface that has been rotated about a vertical axis. The distance between point 910e and point 916e is thus different from the distance between point 912e and point 914e. Thus, the calculation of the location of edge points 920d, 922d, 924d, and 926d, and 920e, 922e, 924e, and 926e, requires appropriate allowances for the rotations.

Figure 9B:
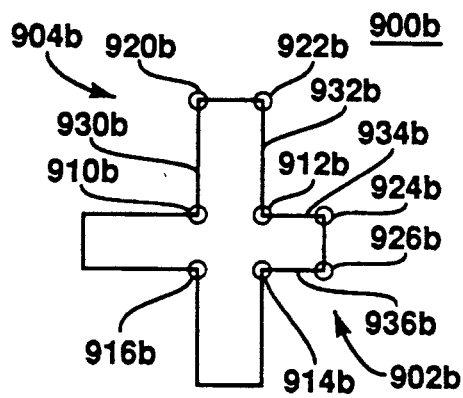
Figure 9E:
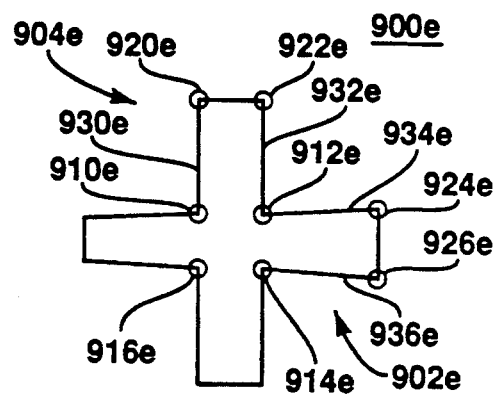

By contrast, FIG. 9B illustrates an image 900b of a pattern on a surface which has not been rotated. The distance between point 910b and point 912b, and the distance between point 916b and point 914b, are the same. The distance between point 910b and point 916b, and the distance between point 912b and point 914b, are also the same. Thus, the location of edge points 920b, 922b, 924b, and 926b, can be calculated without allowance for rotations in the plane of the package face.

Figure 9C:
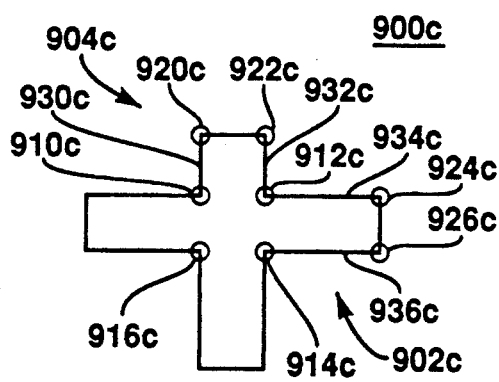

Similarly, FIG. 9C illustrates an image 900c of a pattern on a surface which has not been rotated. The distance between point 910c and point 912c, and the distance between point 916c and point 914c, are the same. The distance between point 910c and point 916c, and the distance between point 912c and point 914c, are also the same. Thus, as with the image 900b of FIG. 9B, in the image 900c, the locations of edge points 920c, 922c, 924c, and 926c, can be calculated without allowance for rotations in the plane of the package face.

Once the plane of the package face has been determined, it is necessary to determine the locations of the edge points, or the intersections of the lines defined on the package face with the edges of the package surface, in order to determine the translational displacement of the package. It will be understood that the determination of the locations of the points on the package face, and the calculation of the plane of the package face does not serve to provide any information regarding the location of the edges of the package face. Rather, the points on the package face could be disposed in any location and orientation with respect to the edges.

In the step of determining the plane of the package face, it has been determined whether there are any rotations of the package about the two axes in the plane of the package face. If there are no such rotations, then the distance along the optical axis between the lens origin and each edge point is known. As the distance between the optical axis and the projection on the image plane of each edge point, and the distance between the image plane and the lens origin are both known, the distance of the edge point from the optical axis can easily be determined. The distance of the edge point from the optical axis is equal to the product of the distance of the projection on the image plane of the edge point from the optical axis and the ratio of the distance between the package face and the lens to the distance between the image plane and the lens. Thus, after determining the displacement of the internal corners, the software is directed, in the step identified by box 148, and labeled ARE THERE ROTATIONS IN PLANE OF PACKAGE FACE? to determine, by comparing distances between pairs of internal corners, to determine whether there are rotations in the plane of the package face. If not, then, as indicated by the line labeled NO extending from box 148, the translational displacements are determined using a simple and fast calculation using the simple ratios set forth above. This is indicated by box 152, which is labeled DETERMINE TRANSLATIONAL DISPLACEMENTS.

However, if it is determined that there are rotations in the plane of the package face, then these rotations must be determined in order to ascertain the location of edge points. A somewhat more involved calculation is required in order to determine the edge point locations. The step of determining the rotations in the plane of the package face is indicated by box 150, labeled DETERMINE ROTATIONS IN PLANE OF PACKAGE FACE. The arrow labeled YES from box 148 leads to box 150, indicating that the rotations need only be determined if it is ascertained in the prior step that rotations exist. In order to explain the calculation of the location, of the edge points where there are rotations in the plane of the package face, the geometric relationships must be explained.

Figure 7:
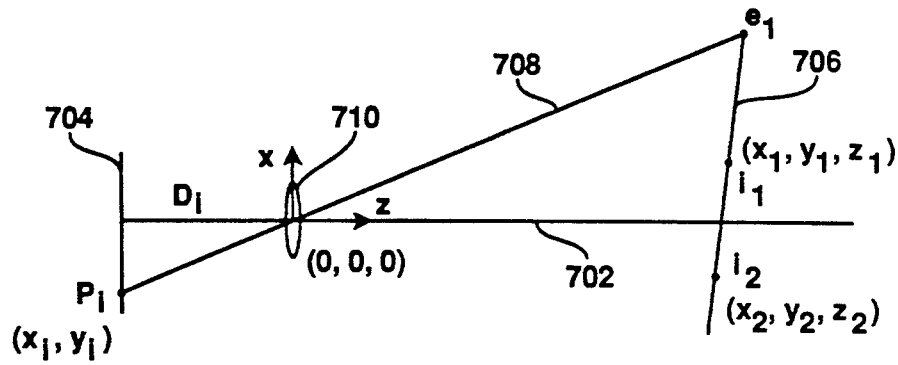
FIG. 7 is a schematic view of the geometry in determining the location of a point on the edge of a surface of an object in a method according to the invention.

Referring now to FIG. 7, the geometric relationships for determining the location of a package edge will be explained. The optical axis is schematically indicated by a horizontal line, 702. On the left side of FIG. 7, there is shown image plane 704, which is conventionally the plane of a CCD array in camera 14. The displacement of the point where the image of the edge point is projected onto the image plane is given by $p_j(X_i, y_j)$. The optical axis is at the origin in this coordinate system. The camera lens 710 is indicated at point o. Line 706 to the righthand side of FIG. 7, which line 706 is rotated slightly from vertical, is in the plane of the face of the package. Two of the internal corners of the cross-shaped pattern, or points on the package face, are indicated by $i_1$ and $i_2$. The location of the edge point of interest is indicated at point $e_1$. For example, referring to FIG. 9D, point i may be point 910d, point $i_1$ may be point 916d, and point e: may be point 920d. Referring to FIG. 7 again, as the three-dimensional locations of the two points $i_1$, $i_2$ on the package face were calculated above, and it is known that those two points and the edge point of interest $e_1$, are collinear, the equation for a line in the plane of the package face, Which line includes the edge point $e_1$, may be calculated. In addition, as the camera origin is known, and the projection on the image plane 704 of the edge point $e_1$ is known, the equation for a second line 708 which includes the edge point $e_1$ may be calculated. By solving for the intersection of these two lines 706, 708, the three-dimensional location of edge point $e_1$ with respect to the camera lens is calculated. It is within the level of skill in the art to provide suitable algorithms to calculate the equations for the two lines 706, 708 that intersect at edge point $e_1$, and to solve for the point of intersection.

Figure 8:
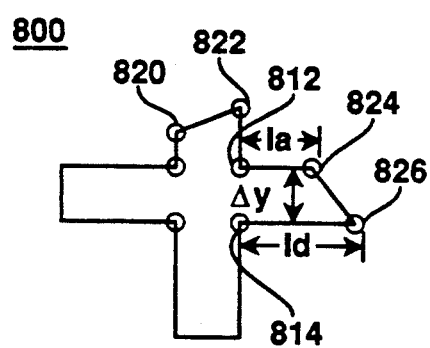
FIG. 8 is a schematic diagram showing the geometric relationships for determination of the rotation of a surface about the optical axis in a method according to the invention.

By the foregoing steps, the displacements of the package in five degrees of freedom, two rotational and three translational, have been determined. The only remaining step is the calculation of the rotation about the optical axis. This step is shown in FIG. 5 by box 154, labeled DETERMINE ROTATIONAL DISPLACEMENTS IN OPTICAL AXIS. Referring now to FIG. 8, image 800 of a pattern which has been projected on a surface rotated about the optional axis is shown. It will be seen that the distance between a first point 812 on the package face and a first point 824 at the package edge is 1u. The distance between a second point 814 on the package face, and a second point 826 on the package edge, is 1d. The separation in the y direction between either the two above-mentioned points 812, 814 on the package face, or the two points 824, 826 on the package edge, is $\Delta y$. It will be understood that the rotation in the z direction $\theta_z$, is defined as follows:

$$\theta_z = \frac{\pi}{2} - a\tan\left(\frac{\Delta y}{\Delta x}\right)$$

where Δx is the absolute value of the difference between 1u and 1d. Again, a suitable algorithm may be provided to carry out this calculation in real-time.

The displacements of the package in six degrees of freedom have now been determined. The next step is to determine whether the package displacement is within preselected tolerances. As noted above, if the displacement exceeds tolerances, then an error signal is provided. If the displacement is within the tolerances, then the displacement values are provided to a system controller.

Satisfactory results have been obtained in testing using a camera having a medium resolution CCD imager providing a 512 by 512 pixel image with an eight-bit gray level. This imager has been adequate to provide, at a distance of about 24 inches from the reference surface, ¼ resolution for translational displacements, and 5 degree resolution for rotational displacements. Obtaining of the image and image processing are preferably performed using a digital signal processing chip. For example, in using data from the above CCD imager example, a TMS 320 DSP chip, by Texas Instruments, was employed, and was able to calculate displacements in less than about 500 milliseconds. Thus, a prototype embodiment of the method and apparatus of the invention was provided that was able to provide displacement information to a system controller in real time, and at a reasonable cost in computational hardware.

Numerous variations of the invention can be envisioned by those of ordinary skill in the art. For example, the camera and strobe light may be mounted in various positions. The lighting pattern may be projected on a different portion of the surface. A variety of lighting patterns may be employed.

It will be appreciated that there are considerable variations that can be accomplished in a method and apparatus of the invention without departing from its scope. As a result, although a preferred embodiment of a method and apparatus of the invention have been described above, it is emphasized that the invention is not limited to a preferred embodiment and there exists other alternative embodiments that are fully encompassed within the invention's scope, which is intended to be limited only by the scope of the appended claims.

What is claimed is:

1. A method for determining the displacement in six degrees of freedom of a rectangular planar surface with respect to a reference position, comprising the steps of:
   (a) obtaining a reference image comprising a projection of a defined lighting pattern comprising at least six points on a reference rectangular planar surface in the reference position, the six points comprising first, second and third points on the reference surface, fourth and fifth points at the intersections of a first edge of the reference surface and, respectively, first and second parallel lines in the plane of the reference surface and perpendicular to said first edge, and a sixth point at the intersection of a second edge of the reference surface and a third line in the plane of the reference surface and perpendicular to said second edge, the first edge being perpendicular to the second edge, said first and second points being in known positional relationship with said first, second and third lines;
   (b) obtaining a real image comprising the projection of said lighting pattern on the surface; and
   (c) determining the displacement of the surface with respect to the reference position from the positions of said six points in said reference image and said real image.

2. A method as recited in claim 1, wherein said lighting pattern comprises at least two bars of predetermined thickness.

3. A method as recited in claim 2, wherein said lighting pattern is a cross-shaped lighting pattern, and said step of obtaining a real image comprises identifying the locations of edges of said cross-shaped lighting pattern in an image of the projection of said cross-shaped lighting pattern on the surface.

4. A method as recited in claim 3, wherein said step of obtaining a real image further comprises the step of identifying at least three internal corners of said image of the projection of said cross-shaped lighting pattern, said internal corners corresponding to said first, second and third points in said real image.

5. A method as recited in claim 3, wherein said step of obtaining a real image further comprises the step of identifying points of intersection of at least three edges of arms of said image of the projection of said cross-shaped lighting pattern and the edges of the surface, said points of intersection corresponding to said fourth, fifth and sixth points in said real image.

6. A method as recited in claim 1, wherein said step of determining comprises determining the displacements of said first, second and third points along an optical axis to determine the plane of the surface.

7. A method as recited in claim 6, wherein said step of determining further comprises determining, based on said determined plane of the surface and the position of said sixth point in said real image, the three-dimensional location of one point on said second edge of said surface.

8. A method as recited in claim 6, wherein said step of determining further comprises determining based on the ratio of the distance between said first point and said fourth point, and the distance between said second point and said fifth point, said distances being identical in said reference image, the rotation of the surface about an optical axis.

9. A method as recited in claim 1, wherein said step of determining comprises comparing relative distances between selected pairs of said points in said real image to determine the absence or presence of rotational displacement of said surface.

10. An apparatus for determining the displacement in six degrees of freedom of a rectangular planar surface with respect to a reference position, comprising:
   (a) means for obtaining a reference image comprising a projection of a defined lighting pattern comprising at least six points on a reference rectangular planar surface in the reference position, the six points comprising first, second and third points on the reference surface, fourth and fifth points at the intersections of a first edge of the reference surface and, respectively, first and second parallel lines in the plane of the reference surface and perpendicular to said first edge, and a sixth point at the intersection of a second edge of the reference surface and a third line in the plane of the reference surface and perpendicular to said second edge, the first edge being perpendicular to the second edge, said first and second points being in known positional relationship with said first, second and third lines;

(b) means for obtaining a real image comprising the projection of the lighting pattern on the surface; and (c) means for determining the displacement of the surface with respect to the reference position from the positions of said six points in said reference image and said real image.

11. An apparatus as recited in claim 10, wherein said lighting pattern comprises at least two bars of predetermined thickness 12. A method as recited in claim 11, wherein said lighting pattern is a cross-shaped lighting pattern, and said real image obtaining means comprises means for identifying the locations of edges of said cross-shaped lighting pattern in an image of the projection of said cross-shaped lighting pattern on the surface.

13. An apparatus as recited in claim 12, wherein said means for obtaining a real image further comprises means for identifying at least three internal corners of said image of the projection of said cross-shaped lighting pattern, said internal corners corresponding to said first, second and third points in said real image.

14. An apparatus as recited in claim 12, wherein said means for obtaining a real image further comprises means for identifying points of intersection of at least three edges of arms of said image of said projection of said cross-shaped lighting pattern and the edges of the surface, said points of intersection corresponding to said fourth, fifth and sixth points in said real image.

15. An apparatus as recited in claim 10, wherein said determining means comprises means for determining the displacements of said, first, second and third points along an optical axis to determine the plane of the surface.

16. An apparatus as recited in claim 15, wherein said determining means further comprises means for determining, based on said determined plane of the surface and the position of said sixth point in said real image, the three-dimensional location of one point on said second edge of said surface.

17. An apparatus as recited in claim 15, wherein said determining means further comprises means for determining, based on the ratio of the distance between said first point and said fourth point, and the distance between said second point and said fifth point, said distance being identical in said reference image, the rotation of the surface about an optical axis.

18. An apparatus as recited in claim 10, wherein said determining means comprises means for comparing relative distances between selected pairs of said points and said real image to determine the absence or presence of rotational displacement of said surface.

19. In a system for automated placement of rectangular objects in a stack, comprising a camera for acquiring an image of the placed object for verification of placement accuracy, the improvement comprising: means, comprising a strobe light, for illuminating at least a portion of the object with a predefined two-dimensional pattern substantially instantaneously at a strobe light intensity substantially greater than the intensity of ambient illumination.

20. The improvement of claim 19, wherein said strobe light intensity is at least about 2000 candles per square foot.

21. The improvement of claim 19, wherein said predefined pattern is a cross-shaped pattern having two arms of selected width.

22. In a method for automated placement of rectangular objects in a stack, comprising the steps of acquiring, by use of a camera, an image of the placed object for verification of placement accuracy, the improvement comprising: the step of illuminating, by use of a strobe light, at least a portion of the object with a predefined two-dimensional pattern substantially instantaneously at a strobe light intensity substantially greater than the intensity of ambient illumination.

23. The improvement of claim 22, wherein said step of illuminating comprises illuminating at a strobe light intensity of at least approximately 2000 candles per square foot.

24. The improvement of claim 22, where said predefined pattern is a cross-shaped pattern having two arms of selected width.

* * * * *